US010040339B2

(12) United States Patent
Kanagai

(10) Patent No.: US 10,040,339 B2
(45) Date of Patent: Aug. 7, 2018

(54) VEHICLE SIDE PORTION STRUCTURE

(71) Applicant: TOYOTA JIDOSHA KABUSHIKI KAISHA, Toyota-shi (JP)

(72) Inventor: Shunsuke Kanagai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/652,395

(22) Filed: Jul. 18, 2017

(65) Prior Publication Data

US 2018/0029646 A1 Feb. 1, 2018

(30) Foreign Application Priority Data

Jul. 29, 2016 (JP) .................................. 2016-150141

(51) Int. Cl.
  *B60J 5/04* (2006.01)
  *B62D 25/02* (2006.01)
  *B60J 5/06* (2006.01)

(52) U.S. Cl.
  CPC ........... *B60J 5/0461* (2013.01); *B60J 5/0451* (2013.01); *B60J 5/06* (2013.01); *B62D 25/025* (2013.01)

(58) Field of Classification Search
  CPC ......... B62D 25/025; B60J 5/0461; B60J 5/06; B60J 5/0451
  USPC .................................... 296/187.12, 209, 155
  See application file for complete search history.

(56) References Cited

U.S. PATENT DOCUMENTS 7,520,557 B2 * 4/2009 Yoshida ..................... B60J 5/06
296/146.6

2006/0000145 A1 * 1/2006 Yoshida ..................... B60J 5/06
49/360
2006/0158008 A1 * 7/2006 Nagashima .......... B62D 21/157
296/203.03
2010/0263283 A1 * 10/2010 Yoshioka ................... B60J 5/06
49/210
2015/0314808 A1 * 11/2015 Jenkins ................ B62D 21/157
296/187.12

FOREIGN PATENT DOCUMENTS

| JP | 2004-276836 A | 10/2004 |
| JP | 2006-347391   | 12/2006 |
| JP | 2007-145118   | 6/2007  |
| JP | 2007-192015 A | 8/2007  |
| JP | 2008-100572 A | 5/2008  |
| JP | 2013-256202 A | 12/2013 |

\* cited by examiner

*Primary Examiner* — Jason S Morrow
(74) *Attorney, Agent, or Firm* — Oblon, McClelland, Maier & Neustadt, L.L.P.

(57) ABSTRACT

A vehicle side portion structure including: a rocker that extends in a vehicle longitudinal direction at a vehicle transverse direction outer side of a vehicle body lower portion; a sliding door that slides in the vehicle longitudinal direction, includes a door inner panel, which is connected to the rocker by a door hinge slidable in the vehicle longitudinal direction and which has a mounted-to portion that is lined up in a vehicle transverse direction with the rocker, and includes a door outer panel that is disposed further toward a vehicle transverse direction outer side than the door inner panel; and a load transmitting member that is mounted to the mounted-to portion and transmits a collision load, which is input to the door outer panel from a vehicle side, to a region of the rocker that is different from a region to which the door hinge is connected.

7 Claims, 9 Drawing Sheets

VEHICLE SIDE PORTION STRUCTURE

CROSS-REFERENCE TO RELATED APPLICATION

This application is based on and claims priority under 35 USC 119 from Japanese Patent Application No. 2016-150141 filed on Jul. 29, 2016, the disclosure of which is incorporated by reference herein.

BACKGROUND

Technical Field

The present disclosure relates to a vehicle side portion structure.

Related Art

Japanese Patent Application Laid-Open (JP-A) No. 2006-347391 discloses a vehicle side portion structure in which a rocker portion and a sliding door of a vehicle are connected in the vehicle transverse direction by a hinge pin and a hinge arm.

In a vehicle that has a sliding door, the rocker and the sliding door are connected in the vehicle transverse direction by a door hinge. Here, the door hinge is structured so as to be able to pivot with the vehicle vertical direction being the axial direction thereof, in order to move the sliding door in the vehicle transverse direction.

Therefore, it is difficult for collision load that is input to be transmitted rectilinearly along the vehicle transverse direction. Thus, at the time of a side collision of the vehicle, the collision load that is transmitted via the door hinge to the rocker is reduced.

SUMMARY

In view of the above-described circumstances, an object of the present disclosure is to provide a vehicle side portion structure that, in a vehicle having a sliding door, can increase the collision load that is transmitted to the rocker at the time of a side collision of the vehicle.

A vehicle side portion structure of a first aspect of the present disclosure has: a rocker that extends in a vehicle longitudinal direction at a vehicle transverse direction outer side of a vehicle body lower portion; a sliding door that slides in the vehicle longitudinal direction, includes a door inner panel, which is connected to the rocker by a door hinge slidable in the vehicle longitudinal direction and which has a mounted-to portion that is lined up in a vehicle transverse direction with the rocker, and includes a door outer panel that is disposed further toward a vehicle transverse direction outer side than the door inner panel; and a load transmitting member that is mounted to the mounted-to portion and transmits a collision load, which is input to the door outer panel from a vehicle side, to a region of the rocker that is different from a region to which the door hinge is connected.

In the vehicle side portion structure of the first aspect of the present disclosure, due to collision load being input to the door outer panel at the time of a side collision, the sliding door deforms toward the vehicle transverse direction inner side. At this time, the collision load is transmitted to the load transmitting member that is mounted to the mounted-to portion of the door inner panel. Further, the load transmitting member transmits the collision load along the vehicle transverse direction to a region of the rocker that is different from the region to which the door hinge is connected. In this way, in the vehicle side portion structure, the load transmitting member forms a transmission path of collision load at a region, which is different than the region that the door hinge is connected to, of the rocker. Therefore, in a vehicle having a sliding door, the collision load that is transmitted to the rocker at the time of a side collision of the vehicle can be increased.

Note that "a region of the rocker that is different from a region to which the door hinge is connected" means, of the respective portions that structure the rocker, a region other than the region to which the door hinge is connected. Further, the "load transmitting member transmits collision load to a region of the rocker which region is different than a region to which the door hinge is connected" is not limited to the load transmitting member contacting the rocker and transmitting the collision load. This includes the load transmitting member contacting another member that contacts the rocker, and transmitting the collision load to the rocker via the other member.

The door hinge of a vehicle side portion structure of a second aspect of the present disclosure has a mounted portion that is disposed between the rocker and the door inner panel, and that is superposed from a vehicle transverse direction inner side on the mounted-to portion, and that is mounted to the mounted-to portion by fasteners, and the load transmitting member is mounted, together with the mounted portion, to the mounted-to portion by the fasteners.

In the vehicle side portion structure of the second aspect of the present disclosure, in a case in which the mounted portion of the door hinge is mounted to the mounted-to portion of the door inner panel by using fasteners, the load transmitting member is, together with the vertical wall portion, mounted to the mounted-to portion by the fasteners. Due thereto, the fasteners that mount the door hinge to the door inner panel, and the fasteners that mount the load transmitting member to the door inner panel, are used in common, and therefore, the number of parts of the vehicle side portion structure can be reduced.

A side member outer panel that structures an outer plate of a vehicle is provided at a vehicle transverse direction outer side of the rocker of a vehicle side portion structure of a third aspect of the present disclosure, and the load transmitting member has a facing portion that faces the side member outer panel in the vehicle transverse direction, and a protruding portion that protrudes from the facing portion toward a vehicle transverse direction inner side and is lined up in a vehicle vertical direction with the rocker and the side member outer panel.

In the vehicle side portion structure of the third aspect of the present disclosure, at the time of a side collision, the facing portion contacts a side surface in the vehicle transverse direction of the side member outer panel, and the protruding portion contacts the rocker and the upper surface or the lower surface in the vehicle vertical direction of the side member outer panel. Namely, the load transmitting member on the one hand, and the rocker and the side member outer panel on the other hand, contact one another at two contacting surfaces that have different orientations. Due thereto, in a case in which collision load in an oblique direction with respect to the vehicle transverse direction is input to the load transmitting member, the collision load can be transmitted from the load transmitting member to the rocker not only in the vehicle transverse direction, but also in the vehicle vertical direction.

An accommodating portion, which is recessed toward a vehicle transverse direction inner side and accommodates the door hinge, is provided at the rocker of a vehicle side portion structure of a fourth aspect of the present disclosure, and the protruding portion has a first protruding portion that protrudes toward an inner side of the accommodating portion, and a second protruding portion that protrudes toward at least one of an upper side and a lower side, in the vehicle vertical direction, of the rocker.

In the vehicle side portion structure of the fourth aspect of the present disclosure, in a case in which collision load is input to the load transmitting member in the vehicle transverse direction, the facing portion contacts a vehicle transverse direction side surface of the rocker, and the first protruding portion contacts the inner surface of the accommodating portion, and the second protruding portion contacts the upper surface or the lower surface in the vehicle vertical direction of the rocker. Namely, at the time of a side collision, there is a state in which the load transmitting member nips portions of the rocker in the vehicle vertical direction, and therefore, the collision load that is transmitted to the rocker at the time of a side collision can be increased.

A lower portion, in a vehicle vertical direction, of a center pillar that is provided so as to extend in the vehicle vertical direction is fixed to the rocker of a vehicle side portion structure of a fifth aspect of the present disclosure, and the load transmitting member is disposed between the door inner panel and the door outer panel so as to span between the rocker and the center pillar when projected in the vehicle transverse direction, and is mounted to the mounted-to portion from a vehicle transverse direction outer side.

In the vehicle side portion structure of the fifth aspect of the present disclosure, because the load transmitting member is mounted to the mounted-to portion between the door inner panel and the door outer panel, the load transmitting member is not affected by constraints of placement between the door inner panel and the rocker. Here, because the load transmitting member is disposed so as to span between the rocker and the center pillar when projected in the vehicle transverse direction, the load transmitting member to which collision load is input moves not only toward the rocker, but also moves toward the center pillar. Due thereto, the collision load that is input to the load transmitting member can be transmitted not only to the rocker, but also to the center pillar, and therefore, the collision load that is transmitted to frame members of the vehicle at the time of a side collision of the vehicle can be increased.

As described above, in accordance with the first aspect of the present disclosure, there is the effect that, in a vehicle having a sliding door, collision load that is transmitted to the rocker at the time of a side collision of the vehicle can be increased.

In accordance with the second aspect of the present disclosure, there is the effect that the number of parts of the vehicle side portion structure can be reduced.

In accordance with the third aspect of the present disclosure, there is the effect that, in a case in which collision load in an oblique direction with respect to the vehicle transverse direction is input to the load transmitting member, the collision load can be transmitted to the rocker from the load transmitting member not only in the vehicle transverse direction but also in the vehicle vertical direction.

In accordance with the fourth aspect of the present disclosure, the collision load that is transmitted to the rocker can be increased also in a case in which collision load in an oblique direction with respect to the vehicle transverse direction is input to the load transmitting member.

In accordance with the fifth aspect of the present disclosure, there is the effect that collision load, which is transmitted to frame members of the vehicle at the time of a side collision of the vehicle, can be increased.

BRIEF DESCRIPTION OF THE DRAWINGS

Exemplary embodiments of the present disclosure will be described in detail based on the following figures, wherein.

DETAILED DESCRIPTION

First Embodiment

Figure 1:
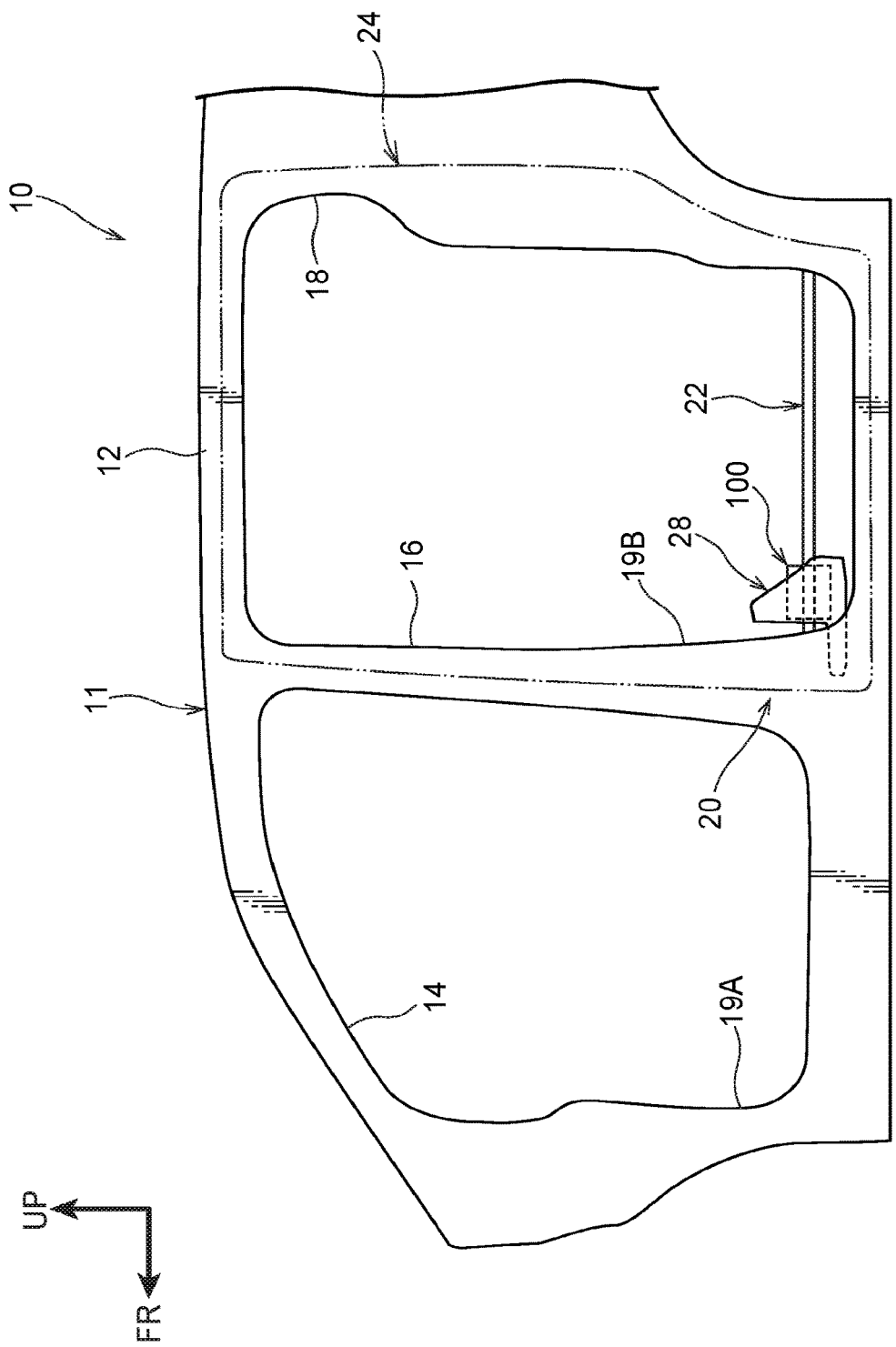
FIG. 1 is a side view showing a side portion of a vehicle body of a vehicle to which a vehicle side portion structure relating to a first embodiment is applied.

A vehicle side portion structure 20 relating to a first embodiment is described hereinafter on the basis of FIG. 1 through FIG. 4. Note that arrow FR that is shown appropriately in the drawings indicates the vehicle front side, arrow UP indicates the vehicle upper side, and arrow OUT indicates a vehicle transverse direction outer side. Further, the vehicle side portion structure 20 is structured so as to have left-right symmetry in the vehicle transverse direction. Therefore, the vehicle left side portion is described hereinafter, and description of the vehicle right side portion is omitted.

A vehicle 10 shown in FIG. 1 has a vehicle body 11. The vehicle body 11 is structured to include a roof side rail 12, a front pillar 14, a center pillar 16, a rear pillar 18, and the vehicle side portion structure 20.

The roof side rail 12 extends in the vehicle longitudinal direction at the upper portion in the vehicle vertical direction of the vehicle body 11. The front pillar 14 extends in the vehicle vertical direction at the front portion in the vehicle longitudinal direction at the vehicle body 11. The center pillar 16 extends in the vehicle vertical direction at the substantially central portion in the vehicle longitudinal direction at the vehicle body 11. The rear pillar 18 extends in the vehicle vertical direction at the rear portion in the vehicle longitudinal direction at the vehicle body 11.

The lower ends in the vehicle vertical direction of the front pillar 14, the center pillar 16 and the rear pillar 18 are joined to a rocker 22 that is described later. Further, the upper ends in the vehicle vertical direction of the front pillar 14, the center pillar 16 and the rear pillar 18 are joined to the roof side rail 12. A front door opening portion 19A for ingress/egress of a vehicle occupant is formed by the front pillar 14, the center pillar 16, the rocker 22 and the roof side rail 12. Further, a rear door opening portion 19B for ingress/egress of vehicle occupants is formed by the center pillar 16, the rear pillar 18, the rocker 22 and the roof side rail 12.

The front door opening portion 19A can be opened and closed by an unillustrated front side door. Note that, in the present embodiment, the unillustrated front side door is structured by a swinging door. The rear door opening portion 19B can be opened and closed by a rear side door 24 that is described later.

[Vehicle Side Portion Structure]

Figure 2:
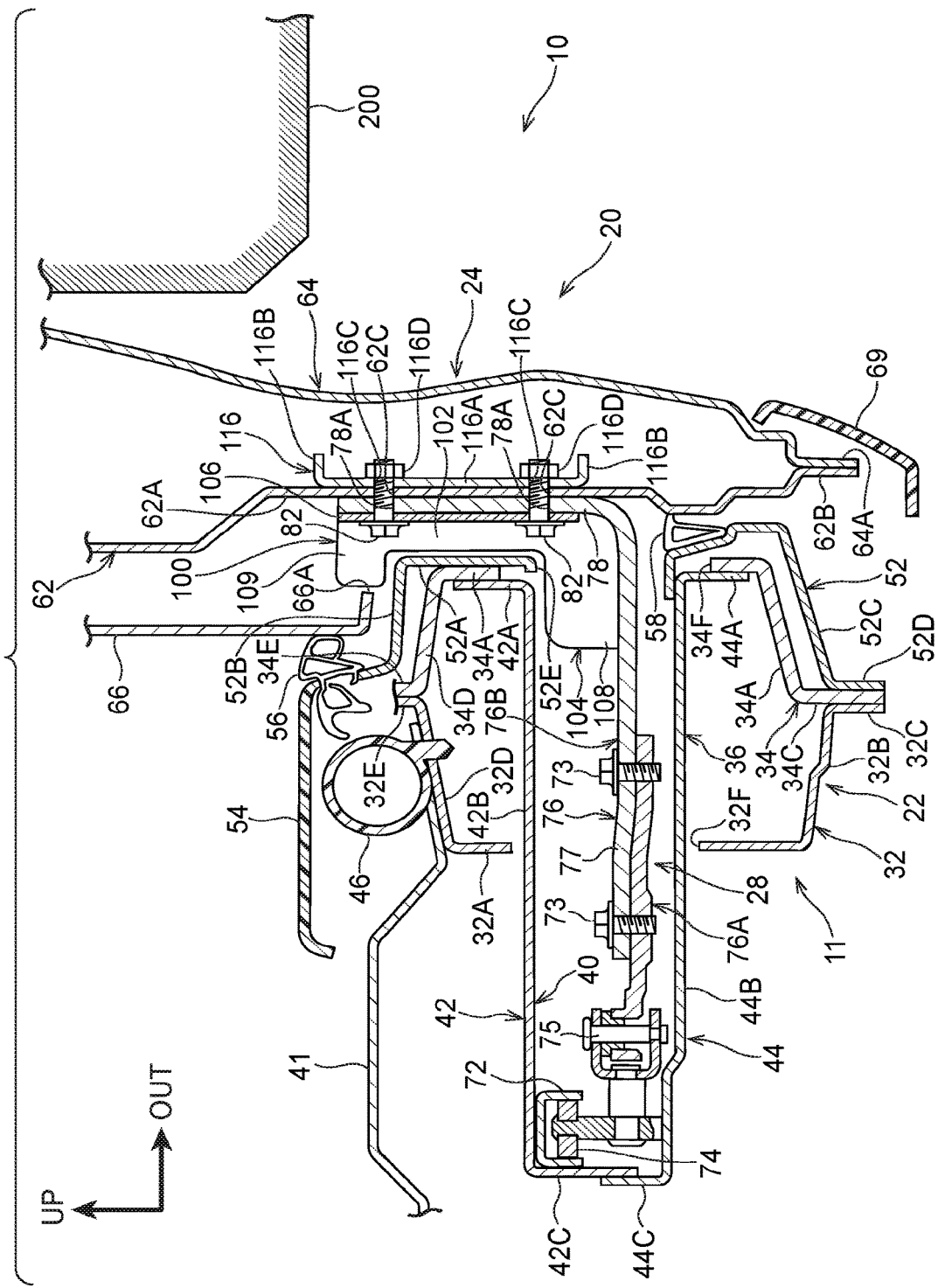
FIG. 2 is an enlarged vertical sectional view of the vehicle side portion structure relating to the first embodiment.

The vehicle side portion structure 20 that is shown in FIG. 2 has the rocker 22, the rear side door 24 that serves as an example of a sliding door, and a load transmitting member 100. The rocker 22 and the rear side door 24 are connected in the vehicle transverse direction by a door hinge 28.

<Rocker>

The rocker 22 extends along the vehicle longitudinal direction at the vehicle transverse direction outer side of the lower portion in the vehicle vertical direction of the vehicle body 11 (see FIG. 1). As described above, the lower portion in the vehicle vertical direction of the center pillar 16 (see FIG. 1) is joined to the rocker 22. Further, as an example, the rocker 22 is structured to include a rocker inner panel 32, a rocker reinforcing panel 34 and a rocker outer panel 36.

The cross-sectional shape, which is cut vertically along the vehicle transverse direction, of the rocker inner panel 32 is formed in a substantial hat shape that opens toward the vehicle transverse direction outer side. Concretely, the rocker inner panel 32 has a vertical wall portion 32A, a lower wall portion 32B, a lower flange portion 32C, an upper wall portion 32D, and an upper flange portion 32E.

The vertical wall portion 32A extends along the vehicle vertical direction and the vehicle longitudinal direction. Further, a through-hole 32F, which passes-through the vertical wall portion 32A in the vehicle transverse direction, is formed in a portion in the vehicle longitudinal direction of the vertical wall portion 32A in the substantially central portion in the vehicle vertical direction. The lower wall portion 32B extends-out obliquely downward from the lower end of the vertical wall portion 32A toward the vehicle transverse direction outer side. The lower flange portion 32C extends-out from the lower end of the lower wall portion 32B toward the vehicle lower side. The upper wall portion 32D extends-out obliquely upward from the upper end of the vertical wall portion 32A toward the vehicle transverse direction outer side. The upper flange portion 32E extends-out toward the vehicle upper side from the upper end of the upper wall portion 32D.

An unillustrated floor panel that structures the floor portion of the vehicle passenger compartment is joined to the lower wall portion 32B. The floor panel is disposed between the left and right rockers 22. A portion of a floor cross member 41 that extends in the vehicle transverse direction is joined to the upper wall portion 32D. The end portion at the vehicle transverse direction inner side of the floor cross member 41 is joined to an unillustrated tunnel portion that is provided at the vehicle transverse direction central portion of the unillustrated floor panel. Further, a tube portion 46, which houses unillustrated wires of the vehicle 10, is provided at the upper wall portion 32D.

The rocker reinforcing panel 34 is disposed further toward the vehicle transverse direction outer side than the rocker inner panel 32. The cross-sectional shape, which is cut vertically along the vehicle transverse direction, of the rocker reinforcing panel 34 is formed in a substantial hat shape that opens toward the vehicle transverse direction inner side. Concretely, the rocker reinforcing panel 34 has a vertical wall portion 34A, a lower wall portion 34B, a lower flange portion 34C, an upper wall portion 34D, and an upper flange portion 34E.

The vertical wall portion 34A extends along the vehicle vertical direction and the vehicle longitudinal direction. Further, the vertical wall portion 34A faces the vertical wall portion 32A in the vehicle transverse direction. Moreover, a through-hole 34F, which passes-through the vertical wall portion 34A in the vehicle transverse direction, is formed in a portion in the vehicle longitudinal direction of the vertical wall portion 34A in the substantially central portion in the vehicle vertical direction. The through-hole 34F faces the through-hole 32F in the vehicle transverse direction. The lower wall portion 34B extends-out obliquely downward from the lower end of the vertical wall portion 34A toward the vehicle transverse direction inner side. The lower flange portion 34C extends-out from the lower end of the lower wall portion 34B toward the vehicle lower side.

The upper wall portion 34D extends-out obliquely upward from the upper end of the vertical wall portion 34A toward the vehicle transverse direction inner side. The upper flange portion 34E extends-out toward the vehicle upper side from the upper end of the upper wall portion 34D. The lower flange portion 32C and the lower flange portion 34C are superposed together and joined together in the vehicle transverse direction. The upper flange portion 32E and the upper flange portion 34E are superposed together and joined together in the vehicle transverse direction.

The rocker outer panel 36 extends from the peripheral edge portion of the through-hole 34F of the rocker reinforcement panel 34 through the through-hole 32F of the rocker inner panel 32, to further toward the vehicle transverse direction inner side than the rocker inner panel 32. Further, as seen in the vehicle longitudinal direction, the rocker outer panel 36 is formed in a substantial U-shape in cross-section that opens toward the vehicle transverse direction outer side.

Concretely, the rocker outer panel 36 is a divided structure that is structured by a rocker outer upper panel 42 that is disposed at the vehicle upper side and a rocker outer lower panel 44 that is disposed at the vehicle lower side, being joined together.

The rocker outer upper panel 42 has a flange portion 42A that extends in the vehicle vertical direction and the vehicle longitudinal direction, an upper wall portion 42B that extends from the lower end portion of the flange portion 42A toward the vehicle transverse direction inner side, and a flange portion 42C that extends toward the vehicle lower side from the end portion at the vehicle transverse direction inner side of the upper wall portion 42B. The flange portion 42A is, from the vehicle transverse direction inner side, superposed with and joined to the region of the above-described vertical wall portion 34A which region corresponds to the vehicle vertical direction upper portion of the peripheral edge portion of the through-hole 34F. The upper wall portion 42B extends from the vertical wall portion 34A, through the through-hole 32F of the rocker inner panel 32, to further toward the vehicle transverse direction inner side than the rocker inner panel 32.

The rocker outer lower panel 44 has a flange portion 44A that extends in the vehicle vertical direction and the vehicle longitudinal direction, a lower wall portion 44B that extends from the upper end portion of the flange portion 44A toward the vehicle transverse direction inner side, and a flange portion 44C that extends toward the vehicle upper side from the end portion at the vehicle transverse direction inner side of the lower wall portion 44B. The flange portion 44A is, from the vehicle transverse direction inner side, superposed with and joined to the region of the above-described vertical wall portion 34A which region corresponds to the vehicle vertical direction lower portion of the peripheral edge portion of the through-hole 34F. The lower wall portion 44B extends from the vertical wall portion 34A, through the through-hole 32F of the rocker inner panel 32, to further toward the vehicle transverse direction inner side than the rocker inner panel 32. The flange portion 44C is, from the vehicle transverse direction inner side, superposed with and joined to the flange portion 42C.

The space at the inner side of the region, which is substantially U-shaped in cross-section, of the rocker outer panel 36 is called an accommodating portion 40. The accommodating portion 40 is a region that is recessed toward the vehicle transverse direction inner side at the rocker 22, and accommodates the door hinge 28 that is described later. The rocker outer panel 36 is an example of an accommodating member that has the accommodating portion 40.

A portion of a side member outer panel 52 is, from the vehicle transverse direction outer side, superposed with and joined to the vertical wall portion 34A and the lower flange portion 34C of the rocker reinforcing panel 34, and the vehicle transverse direction outer end portion of the lower wall portion 44B of the rocker outer lower panel 44.

(Side Member Outer Panel)

The side member outer panel 52 is a member that structures the outer plate of the vehicle 10, and is structured to include a vertical wall portion 52A, an upper wall portion 52B, a lower wall portion 52C and a lower flange portion 52D, and extends in the vehicle longitudinal direction. The vertical wall portion 52A is lined up in the vehicle transverse direction with the vertical wall portion 34A of the rocker reinforcing panel 34, and extends in the vehicle vertical direction. A through-hole 52E that passes-through in the vehicle transverse direction is formed in the vertical wall portion 52A. The through-hole 52E communicates with the above-described through-hole 34F, and opens the vehicle transverse direction outer side end portion of the accommodating portion 40 toward the rear side door 24 that is described later. Further, a weather strip 58 is provided at a region of the vertical wall portion 52A which region is further toward the vehicle lower side than the through-hole 52E and faces the rear side door 24 in the vehicle transverse direction.

From the upper end portion of the vertical wall portion 52A, the upper wall portion 52B is bent toward the vehicle transverse direction inner side and extends in the vehicle transverse direction. The upper wall portion 52B is disposed further toward the vehicle upper side than the rocker reinforcing panel 34. Moreover, a scuff plate 54 and an opening seal 56 are provided at a portion of the upper wall portion 52B. From the lower end portion of the vertical wall portion 52A, the lower wall portion 52C is bent toward the vehicle transverse direction inner side and extends in the vehicle transverse direction. The lower flange portion 52D extends from the vehicle transverse direction inner side end portion of the lower wall portion 52C toward the lower side in the vehicle vertical direction. Further, the lower flange portion 52D is superposed and joined, from the vehicle transverse direction outer side, with the lower flange portion 34C of the rocker reinforcing panel 34.

<Rear Side Door>

The rear side door 24 is disposed further toward the vehicle transverse direction outer side than the rocker 22 and the side member outer panel 52. The rear side door 24 is connected to the rocker 22 via the door hinge 28 that will be described later, and can move in the vehicle transverse direction and the vehicle longitudinal direction. Moreover, the rear side door 24 is structured to include a door inner panel 62, a door outer panel 64, and a door trim 66. At the rear side door 24, the door inner panel 62 and the door outer panel 64 are made integral and form a closed cross-section.

The door inner panel 62 is a press-molded part that is plate-shaped and extends in the vehicle longitudinal direction and the vehicle vertical direction. The door inner panel 62 has a mounted-to portion 62A to which the load transmitting member 100 that is described later is mounted, and a lower flange portion 62B that extends in the vehicle vertical direction at further toward the vehicle lower side than the mounted-to portion 62A.

The mounted-to portion 62A is a portion of the vertical wall that extends in the vehicle vertical direction at the door inner panel 62. Further, the mounted-to portion 62A is disposed so as to be lined up in the vehicle transverse direction with the rocker 22 and the side member outer panel 52. Concretely, the mounted-to portion 62A is disposed at a position facing the vertical wall portion 52A of the side member outer panel 52 with a gap therebetween in the vehicle transverse direction, in the state in which the rear side door 24 closes the rear door opening portion 19B (see FIG. 1). Through-holes 62C that pass-through in the vehicle transverse direction are formed in the mounted-to portion 62A at, as an example, four places with intervals therebetween in the vehicle vertical direction and the vehicle longitudinal direction. Bolts 82 that are described later are inserted in the through-holes 62C.

The door trim 66, which covers the door inner panel 62 from the vehicle transverse direction inner side, is provided further toward the vehicle upper side than the vehicle vertical direction center of the mounted-to portion 62A of the door inner panel 62. An opening portion 66A that opens toward the vehicle lower side is formed in the lower end portion in the vehicle vertical direction of the door trim 66.

The door outer panel 64 is a press-molded part that is plate-shaped and that extends in the vehicle longitudinal direction and the vehicle vertical direction in the same way as the door inner panel 62, and is disposed further toward the vehicle transverse direction outer side than the door inner panel 62. Further, the door outer panel 64 protrudes-out toward the vehicle transverse direction outer side and is formed so as to be curved gently. The surface at the vehicle transverse direction outer side of the door outer panel 64 is a design surface that structures a portion of the exterior design of the vehicle 10. A lower flange portion 64A, which extends in the vehicle vertical direction, is formed at the vehicle lower side of the door outer panel 64. The lower flange portion 64A is joined to the lower flange portion 62B in the vehicle transverse direction. Further, a door molding 69 is provided at the lower portion in the vehicle vertical direction of the door outer panel 64.

<Door Hinge>

The door hinge 28 is structured to include a slide rail 72, a guide roller 74, a hinge pin 75 and a hinge arm 76, and is accommodated at the inner side of the accommodating portion 40. Further, the door hinge 28 connects the rocker 22 and the rear side door 24 in the vehicle transverse direction, and makes possible movement of the rear side door 24 in the vehicle transverse direction and movement of the rear side door 24 in the vehicle longitudinal direction. Note that a portion of the hinge arm 76 projects-out further toward the vehicle transverse direction outer side than the side member outer panel 52.

The slide rail 72 is formed in a substantial U-shape in cross-section that opens toward the vehicle lower side, and extends in the vehicle longitudinal direction. Further, the slide rail 72 is joined to the rocker outer upper panel 42 at the vehicle transverse direction inner side end of the accommodating portion 40. The guide roller 74 is disposed such that the axial direction thereof is the vehicle vertical direction, and can move along the slide rail 72. The hinge pin 75 is disposed with the vehicle vertical direction being the central axis direction thereof.

The hinge arm 76 has a first hinge arm 76A and a second hinge arm 76B. Portions of the first hinge arm 76A and the second hinge arm 76B are superposed together in the vehicle vertical direction and are fastened together by a bolt 73 and an unillustrated nut. The first hinge arm 76A extends in the vehicle transverse direction. Further, the vehicle transverse direction inner side end portion of the first hinge arm 76A is pivotally connected to the hinge pin 75. The second hinge arm 76B has an extending portion 77 that extends in the vehicle transverse direction and a mounted portion 78 that extends along the vehicle vertical direction. The extending portion 77 is formed in the shape of a plate whose thickness direction is the vehicle vertical direction.

The mounted portion 78 extends toward the vehicle upper side from the vehicle transverse direction outer side end portion of the extending portion 77, and is formed in the shape of a plate whose thickness direction is the vehicle transverse direction. Through-holes 78A that pass-through in the vehicle transverse direction are formed in the mounted portion 78. As an example, the through-holes 78A are formed at four places with intervals therebetween in the vehicle vertical direction and the vehicle longitudinal direction. Further, the mounted portion 78 is disposed between the side member outer panel 52 (the rocker 22) and the door inner panel 62, and is superposed from the vehicle transverse direction inner side on the above-described mounted-to portion 62A, and is mounted to the mounted-to portion 62A by the bolts 82 that serve as an example of fasteners.

<Load Transmitting Member>

Figure 3:
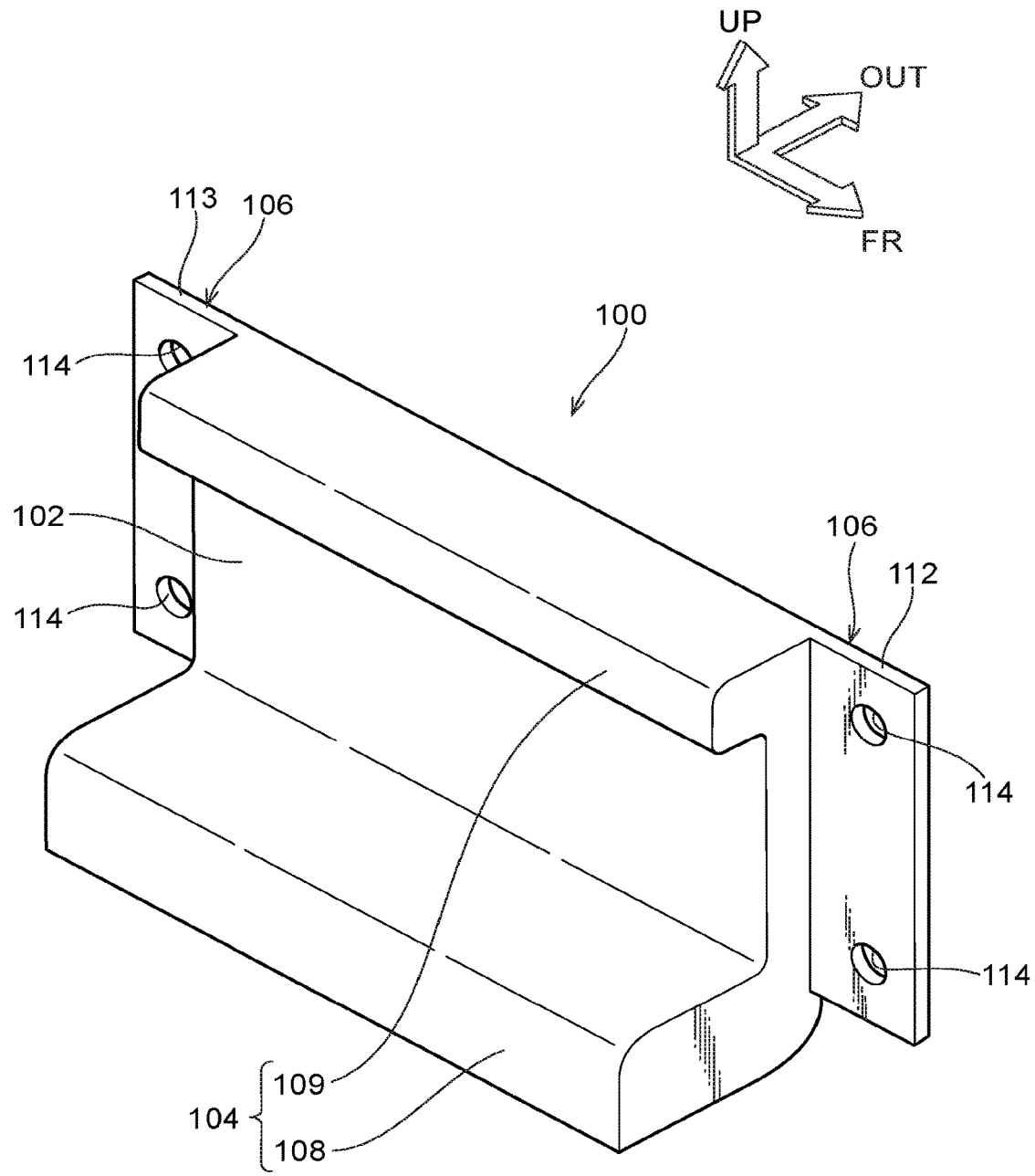
FIG. 3 is a perspective view of a load transmitting member relating to the first embodiment.

As shown in FIG. 3, the load transmitting member 100 has a vertical wall portion 102, a protruding portion 104 that protrudes toward the vehicle transverse direction inner side from the vertical wall portion 102, and flange portions 106 that jut-out toward the vehicle longitudinal direction both sides from the vertical wall portion 102. Further, the load transmitting member 100 is formed of iron for example, and is formed by forging.

The vertical wall portion 102 is a region that is parallelepiped and extends in the vehicle longitudinal direction and the vehicle vertical direction. Further, the vertical wall portion 102 is an example of a facing portion, and faces the vertical wall portion 52A (see FIG. 2) of the side member outer panel 52 in the vehicle transverse direction. The length in the vehicle vertical direction of the vertical wall portion 102 is longer than the length in the vehicle vertical direction of the vertical wall portion 52A. Further, as an example, the length in the vehicle vertical direction of the vertical wall portion 102 is made to be a length that is substantially the same as the length in the vehicle vertical direction of the mounted portion 78 (see FIG. 2).

The protruding portion 104 protrudes toward the vehicle transverse direction inner side from the vertical wall portion 102, and is a region that is lined up in the vehicle vertical direction with the rocker 22 and the side member outer panel 52 (see FIG. 2). Further, as an example, the protruding portion 104 has a first protruding portion 108, which protrudes toward the vehicle transverse direction inner side from the lower end portion in the vehicle vertical direction of the vertical wall portion 102, and a second protruding portion 109 that protrudes toward the vehicle transverse direction inner side from the upper end portion in the vehicle vertical direction of the vertical wall portion 102.

As shown in FIG. 2, the first protruding portion 108 protrudes from the vertical wall portion 102 toward the inner side of the accommodating portion 40. Further, the region, which is from the central portion to the inner side end portion in the vehicle transverse direction, of the first protruding portion 108 is disposed at the inner side of the accommodating portion 40. Further, at further toward the lower side in the vehicle vertical direction than the upper wall portion 42B and the upper portion of the vertical wall portion 34A and the upper portion of the vertical wall portion 52A, the first protruding portion 108 is disposed so as to face the upper wall portion 42B and the upper portion of the vertical wall portion 34A and the upper portion of the vertical wall portion 52A with a gap therebetween in the vehicle vertical direction. As an example, the vehicle transverse direction inner side end of the first protruding portion 108 is disposed further toward the vehicle transverse direction outer side than the joined position of the rocker reinforcing panel 34 and the rocker inner panel 32 in the vehicle transverse direction.

As an example, the second protruding portion 109 protrudes from the vertical wall portion 102 toward the upper sides in the vehicle vertical direction of the rocker 22 and the side member outer panel 52. Concretely, the second protruding portion 109 is disposed further toward the upper side than the upper wall portion 52B of the side member outer panel 52, with an interval in the vehicle vertical direction therebetween. Further, the second protruding portion 109 is, as an example, disposed at the inner side of the opening portion 66A of the door trim 66. The vehicle transverse direction inner side end of the second protruding portion 109 is, as an example, positioned at the upper side of the joined position of the rocker reinforcing panel 34 and the rocker outer upper panel 42. The length in the vehicle vertical direction of the second protruding portion 109 is, as an example, shorter than the length in the vehicle vertical direction of the first protruding portion 108.

As shown in FIG. 3, the flange portions 106 are formed in the shapes of plates whose thickness in the vehicle transverse direction is thinner than that of the vertical wall portion 102 as an example. Further, the flange portions 106 are structured by a flange 112 that juts-out toward the front side from the front surface in the vehicle longitudinal direction of the vertical wall portion 102, and a flange 113 that juts-out toward the rear side from the rear surface in the vehicle longitudinal direction of the vertical wall portion 102. Through-holes 114 that pass-through in the vehicle transverse direction are formed in the flange 112 and the flange 113. As an example, the through-holes 114 are formed at four places with intervals therebetween in the vehicle vertical direction and the vehicle longitudinal direction.

(Hinge Retainer)

As shown in FIG. 2, a hinge retainer 116 that serves as an example of a reinforcing member is provided at the vehicle transverse direction outer side of the mounted-to portion 62A. The hinge retainer 116 is formed in a substantial U-shape in cross-section that opens toward the vehicle transverse direction outer side. The hinge retainer 116 has a vertical wall portion 116A that extends in the vehicle vertical direction, and flange portions 116B that jut-out toward the vehicle transverse direction outer side from the upper end portion and the lower end portion in the vehicle vertical direction of the vertical wall portion 116A.

The vertical wall portion 116A is superposed with and joined to the mounted-to portion 62A from the vehicle transverse direction outer side. Further, as an example, four through-holes 116C are formed in the vertical wall portion 116A with intervals therebetween in the vehicle vertical direction and the vehicle longitudinal direction. Weld nuts 116D are joined to the peripheral edge portions of the through-holes 116C at the vehicle transverse direction outer side surface of the vertical wall portion 116A. The above-described bolts 82 are screwed-together with the weld nuts 116D.

Here, in the assembling of the load transmitting member 100, in the state in which the rear side door 24 is disposed at the open position, the mounted portion 78 is superposed on the mounted-to portion 62A from the vehicle transverse direction inner side. Moreover, in the state in which the flange portions 106 are superposed on the mounted portion 78 from the vehicle transverse direction inner side, the bolts 82 are inserted-through the through-holes 114 (see FIG. 3), the through-holes 78A, the through-holes 62C and the through-holes 116C. Then, the bolts 82 are screwed-together with the weld nuts 116D, and the vertical wall portion 116A, the mounted-to portion 62A, the mounted portion 78, and the flange portions 106 are fastened together. Due thereto, the load transmitting member 100 is mounted, together with the mounted portion 78, to the mounted-to portion 62A.

At the time of a side collision of the vehicle 10, due to the load transmitting member 100 contacting the side member outer panel 52, the collision load that is input from the vehicle side to the door outer panel 64 is transmitted to a region of the rocker 22 that is different from the region to which the door hinge 28 is connected. Note that, in the present embodiment, the region, to which the door hinge 28 is connected, of the rocker 22 is the region where the slide rail 72 is joined to the rocker outer upper panel 42. Further, the region, which is different than the region to which the door hinge 28 is connected, is the region where the rocker outer upper panel 42, the rocker reinforcing panel 34 and the side member outer panel 52 are joined, and is the vertical wall portion 52A.

(Operation and Effects)

Operation and effects of the vehicle side portion structure 20 of the first embodiment are described next.

Figure 4:
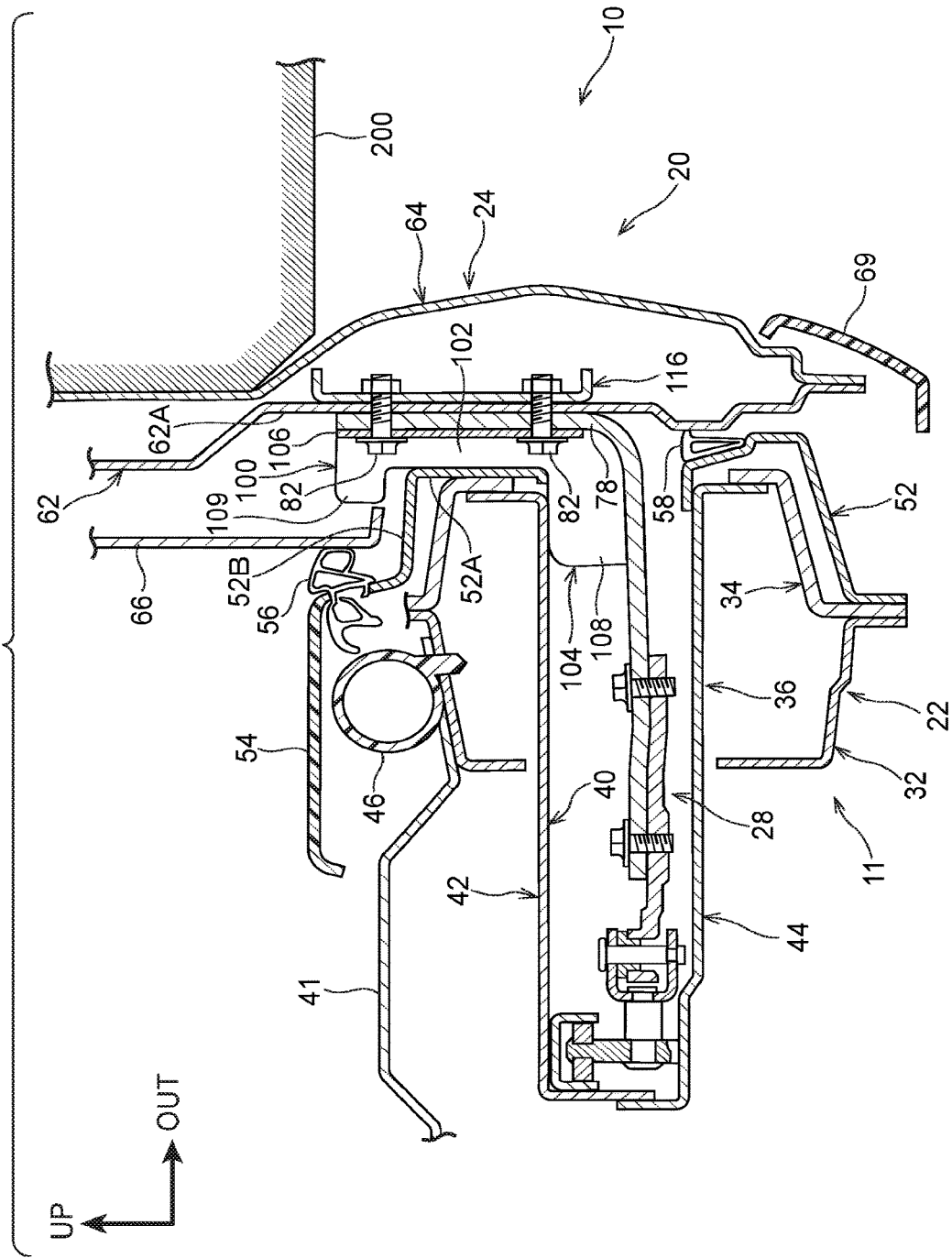
FIG. 4 is an explanatory drawing showing a state in which a barrier has side-collided with a sliding door relating to the first embodiment.

As shown in FIG. 4, at the vehicle side portion structure 20, in a case in which a barrier 200 that is a collision object collides with the rear side door 24 at the time of a side collision, due to collision load being input to the door outer panel 64, the rear side door 24 deforms and is displaced toward the vehicle transverse direction inner side. Further, the load transmitting member 100 contacts the vertical wall portion 52A of the side member outer panel 52. Here, the collision load that is input to the door outer panel 64 is transmitted via the mounted-to portion 62A to the load transmitting member 100. Moreover, the collision load that is transmitted to the load transmitting member 100 is, via the load transmitting member 100, transmitted to the vertical wall portion 52A and the rocker 22, and is, via the floor cross member 41 and the unillustrated floor panel, transmitted toward the opposite side in the vehicle transverse direction.

As described above, at the vehicle side portion structure 20, the load transmitting member 100 forms a transmission path of collision load at a region that is different than the region, to which the door hinge 28 is connected, of the rocker 22. Therefore, as compared with a structure that does not have the load transmitting member 100, the collision load that is transmitted to the rocker 22 at the time of a side collision of the vehicle 10 can be increased.

Further, at the vehicle side portion structure 20, in a case in which the mounted portion 78 of the door hinge 28 is mounted to the mounted-to portion 62A of the door inner panel 62 by using the bolts 82, the load transmitting member 100 is mounted together with the mounted portion 78 to the mounted-to portion 62A by the bolts 82. Due thereto, the fasteners that mount the door hinge 28 to the door inner panel 62, and the fasteners that mount the load transmitting member 100 to the door inner panel 62, are used in common, and therefore, the number of parts of the vehicle side portion structure 20 can be reduced.

Moreover, at the vehicle side portion structure 20, the load transmitting member 100 and the mounted portion 78 of the door hinge 28 are both fastened to the mounted-to portion 62A. Therefore, the collision load at the time of a side collision is transmitted not only along the transmission path that heads from the mounted-to portion 62A via the load transmitting member 100 toward the rocker 22, but also along the transmission path that heads from the mounted-to portion 62A via the door hinge 28 toward the rocker outer panel 36. Because there are plural transmission paths of the collision load in this way, the collision load that is transmitted to the rocker 22 at the time of a side collision of the vehicle 10 can be increased.

In addition, at the vehicle side portion structure 20, at the time of a side collision, in a case in which the load transmission member 100 is moved obliquely upward with respect to the vehicle transverse direction as an example, the vertical wall portion 102 contacts a vehicle transverse direction side surface (the vertical wall portion 52A) of the side member outer panel 52. Moreover, the first protruding portion 108 contacts the rocker 22 and the lower surface in the vehicle vertical direction of the side member outer panel 52. Namely, the load transmitting member 100 on the one hand, and the rocker 22 and the side member outer panel 52 on the other hand, contact one another at two contacting surfaces that have different orientations. In a case in which collision load in a direction oblique to the vehicle transverse direction is input to the load transmitting member 100, the collision load can be transmitted from the load transmitting member 100 to the rocker 22 not only in the vehicle transverse direction but also in the vehicle vertical direction.

As a modified example of the vehicle side portion structure 20, description is given of a structure in which the size of the interval in the vehicle vertical direction between the first protruding portion 108 and the second protruding portion 109 is substantially equal to the height of the vertical wall portion 52A in the vehicle vertical direction. In this structure, when collision load is input to the load transmitting member 100 in the vehicle transverse direction, the vertical wall portion 102 contacts the side surface of the rocker 22 (including the vertical wall portion 52A), and the first protruding portion 108 contacts the inner surface (the lower surface) of the accommodating portion 40, and the second protruding portion 109 contacts the upper surface of the rocker 22 (including the upper wall portion 52B).

Namely, in the modified example, at the time of a side collision, there is a state in which the load transmitting member 100 is nipped-in in the vehicle vertical direction by portions of the rocker 22. Therefore, in a case in which collision load in the vehicle transverse direction is input to the load transmitting member 100, the state of contact of the load transmitting member 100 and the rocker 22 is maintained. Due thereto, the surface area of contact between the load transmitting member 100 and the rocker 22 is large as compared with a structure in which the load transmitting member 100 contacts only the vertical wall portion 52A. Therefore, the collision load that is transmitted from the load transmitting member 100 to the rocker 22 can be increased.

Second Embodiment

A vehicle side portion structure 120 relating to a second embodiment is described next on the basis of FIG. 5 through FIG. 8. Note that structures that are similar to those of the first embodiment are denoted by the same reference numerals, and description thereof is omitted as appropriate.

Figure 5:
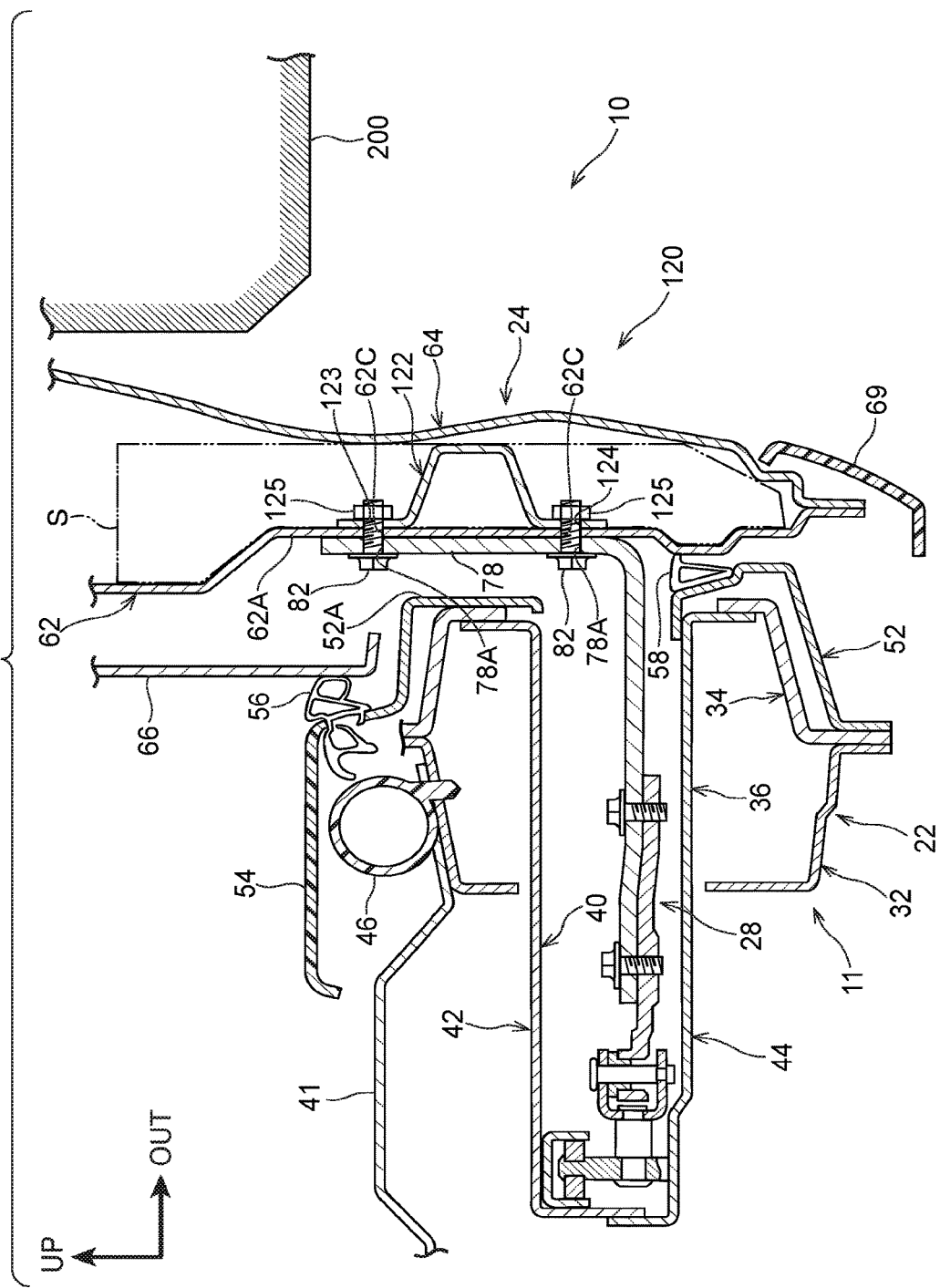
FIG. 5 is an enlarged vertical sectional view of a vehicle side portion structure relating to a second embodiment.

A vehicle side portion structure 120 shown in FIG. 5 is structured such that a load transmitting member 122 is provided instead of the load transmitting member 100 and the hinge retainer 116 (see FIG. 2) in the vehicle side portion structure 20 relating to the first embodiment (see FIG. 2). Namely, the vehicle side portion structure 120 has the rocker 22, the rear side door 24 and the load transmitting member 122. Note that structures other than the load transmitting member 122 are structured similarly to those of the vehicle side portion structure 20.

<Load Transmitting Member>

The load transmitting member 122 is disposed between the door inner panel 62 and the door outer panel 64, and is mounted to the mounted-to portion 62A from the vehicle transverse direction outer side. In FIG. 5, when viewing the rear side door 24 and the load transmitting member 122 from the vehicle longitudinal direction, the outer edge of the region in which the load transmitting member 122 is disposed is shown by the two-dot chain line S. As an example, the load transmitting member 122 is provided within a region from the height of the vicinity of the lower end portion of the rear side door 24 to a height that is lined up with the lower portion of the door trim 66 in the vehicle transverse direction. Note that the interval in the vehicle transverse direction between the mounted-to portion 62A or the mounted portion 78 and the vertical wall portion 52A is set in advance such that, at the time of a side collision of the vehicle 10, the mounted-to portion 62A or the mounted portion 78 and the vertical wall portion 52A contact one another.

Figure 6:
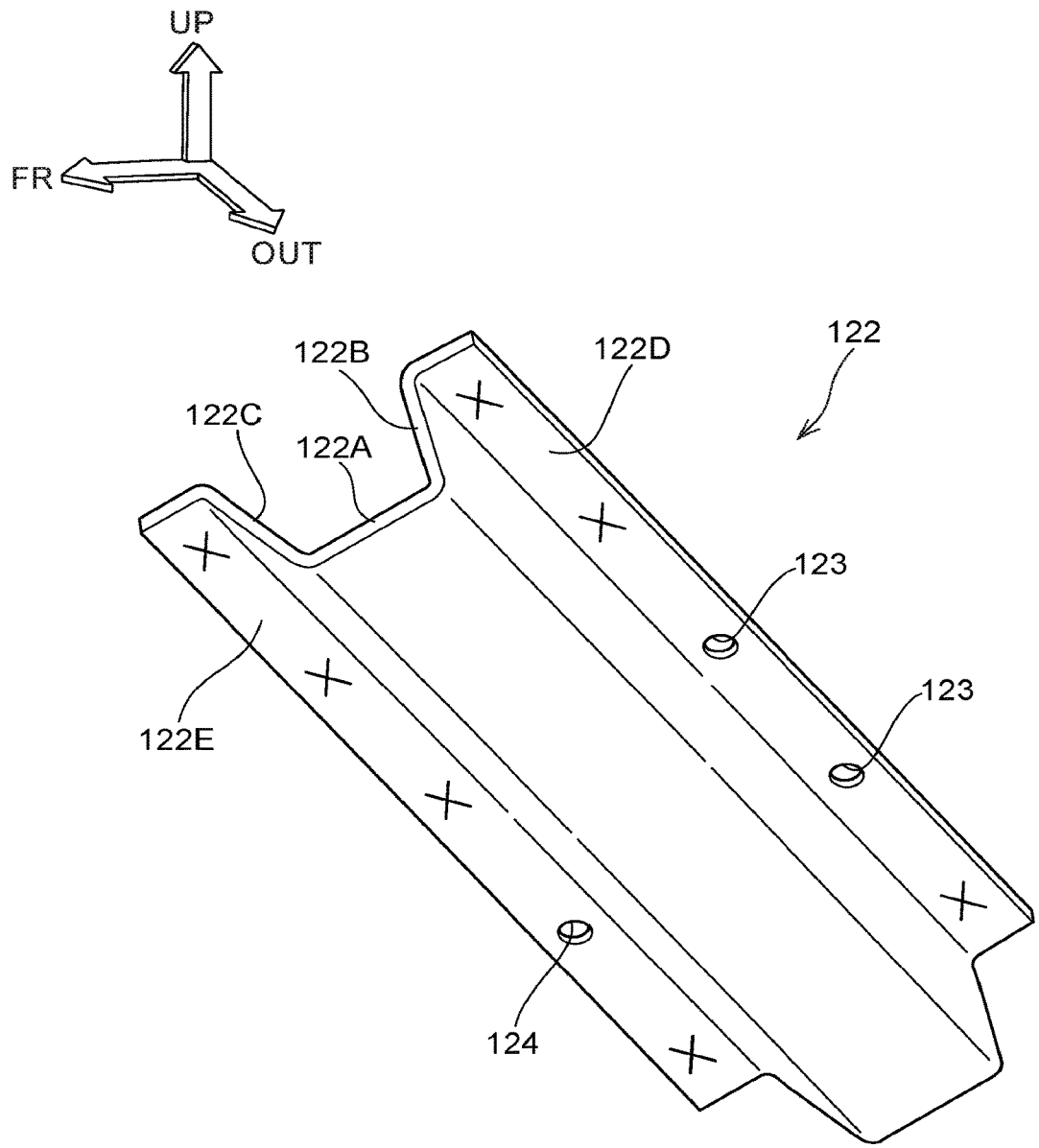
FIG. 6 is a perspective view of a load transmitting member relating to the second embodiment.

As shown in FIG. 6, the load transmitting member 122 is, as an example, a member that is structured by impact pressing. As seen from the vehicle longitudinal direction, the load transmitting member 122 is formed in a hat shape in cross-section that opens toward the vehicle transverse direction inner side. Concretely, the load transmitting member 122 is structured to include a vertical wall 122A, an upper wall 122B, a lower wall 122C, an upper flange 122D and a lower flange 122E. Further, the load transmitting member 122 is formed of iron as an example. The load transmitting member 122 may be formed of aluminum.

Figure 7:
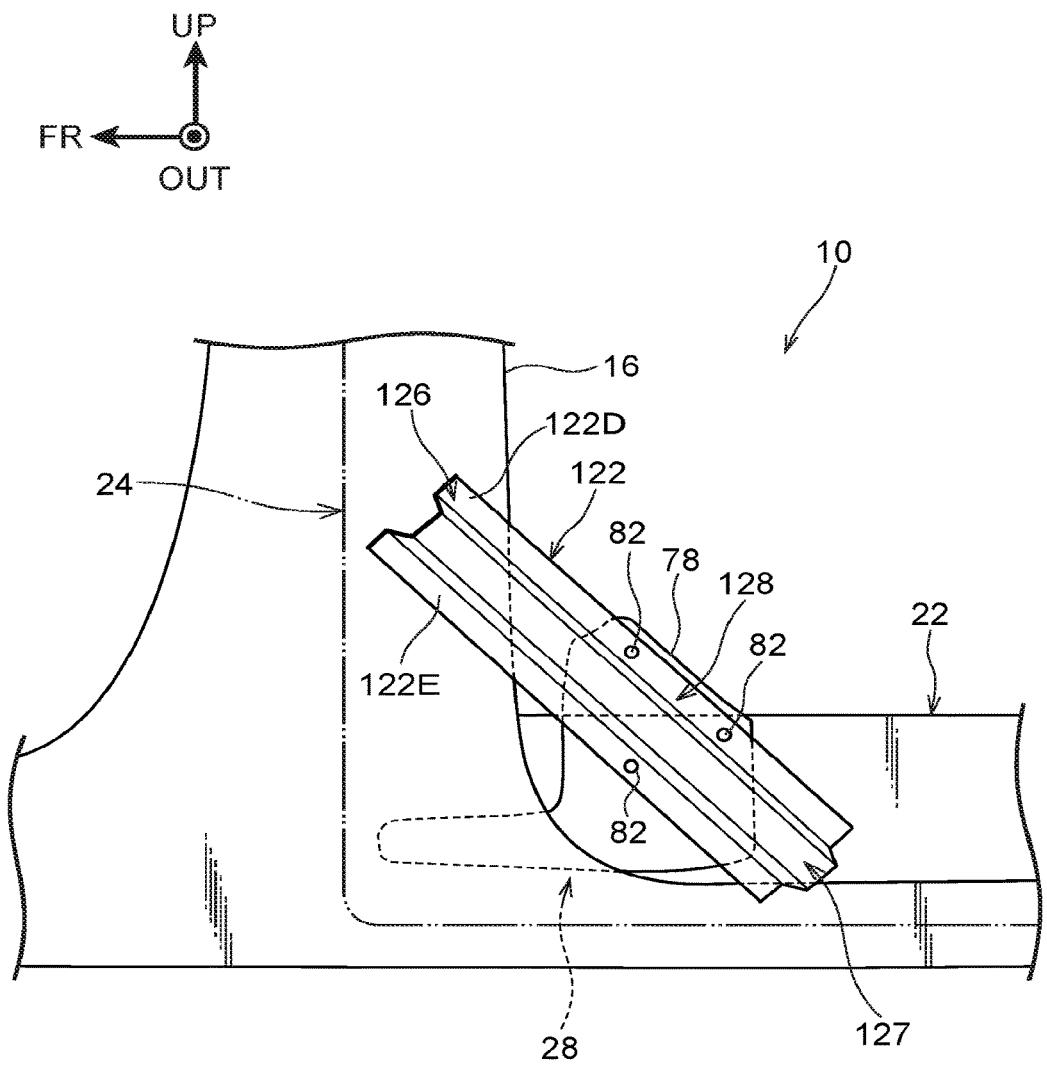
FIG. 7 is an explanatory drawing showing the state of placement of the load transmitting member relating to the second embodiment.

Note that the entire load transmitting member 122 is disposed along the vehicle transverse direction outer side surface of the door inner panel 62 (see FIG. 5). Therefore, although the load transmitting member 122 is, in actuality, bent locally, in FIG. 6 and FIG. 7, illustration of the bent portions is omitted and the load transmitting member 122 is shown as a rectilinear member, in order to illustrate the load transmitting member 122 in an easy-to-understand manner. Further, in FIG. 7, the door hinge 28 is illustrated in a simplified manner.

The vertical wall 122A that is shown in FIG. 6 runs along the vehicle vertical direction. The upper wall 122B extends from the upper end portion of the vertical wall 122A toward the vehicle transverse direction inner side. The lower wall 122C extends from the lower end portion of the vertical wall 122A toward the vehicle transverse direction inner side to substantially the same length as the upper wall 122B. The upper flange 122D extends upward from the end portion, which is at the side opposite the vertical wall 122A side, of the upper wall 122B. Through-holes 123 that pass-through in the vehicle transverse direction are formed in two places of the upper flange 122D as an example. The lower flange 122E extends downward from the end portion, which is at the side opposite the vertical wall 122A side, of the lower wall 122C. A through hole 124 that passes-through in the vehicle transverse direction is formed in one place of the lower flange 122E as an example. Note that, in FIG. 6, the regions of the load transmitting member 122 that are spot-welded are shown by the X marks.

Other than the regions thereof at which the through-holes 123 and the through-hole 124 are formed, the upper flange 122D and the lower flange 122E are joined to the mounted-to member 62A (see FIG. 5). Note that, although illustration thereof is omitted in FIG. 6, weld nuts 125 (see FIG. 5) are provided at the peripheral edge portions of the through-holes 123 and the through-hole 124 at the surfaces that are at the vehicle transverse direction outer sides of the upper flange 122D and the lower flange 122E.

As shown in FIG. 5, the through-holes 123 and the through-hole 124 are formed at positions that communicate with the through-holes 62C of the mounted-to portion 62A and the through-holes 78A of the mounted portion 78. Namely, a portion of the load transmitting member 122 is joined to the mounted-to portion 62A, and another portion is, via the mounted-to portion 62A, fastened together with the mounted portion 78 by the bolts 82.

As shown in FIG. 7, as seen from the vehicle transverse direction, the lower side in the vehicle vertical direction of the load transmitting member 122 is disposed further toward the rear side in the vehicle longitudinal direction than the upper side thereof. In other words, the load transmitting member 122 is disposed with the axial direction thereof being an oblique direction that intersects the vehicle vertical direction. Further, when the load transmitting member 122 is projected in the vehicle transverse direction, an upper end portion 126 is disposed at a place that overlaps the center pillar 16, and a lower end portion 127 is disposed at a place that overlaps the rocker 22, and a central portion 128 is disposed at a place that overlaps the door hinge 28. Namely, when projected in the vehicle transverse direction, the load transmitting member 122 is disposed at an incline so as to span between the rocker 22 and the center pillar 16. Note that the reason why the load transmitting member 122 can be placed at an incline is because, due to the load transmitting member 122 being disposed between the door inner panel 62 and the door outer panel 64 (see FIG. 5), the load transmitting member 122 is not affected by constraints of placement between the door inner panel 62 and the rocker 22.

At the time of a side collision of the vehicle 10, due to the load transmitting member 122 shown in FIG. 5 contacting the door outer panel 64, the load transmitting member 122 transmits the collision load, which is input to the door outer panel 64 from the vehicle side, to the door inner panel 62 and the door hinge 28. Further, the mounted-to portion 62A is lined up in the vehicle transverse direction with the vertical wall portion 52A of the side member outer panel 52. Therefore, the collision load, which is transmitted to the load transmitting member 122 at the time of a side collision of the vehicle 10, is transmitted to the rocker 22 and the floor cross member 41 due to the mounted-to portion 62A or the mounted portion 78 contacting the vertical wall portion 52A.

[Operation and Effects]

Operation and effects of the vehicle side portion structure 120 of the second embodiment are described next.

Figure 8:
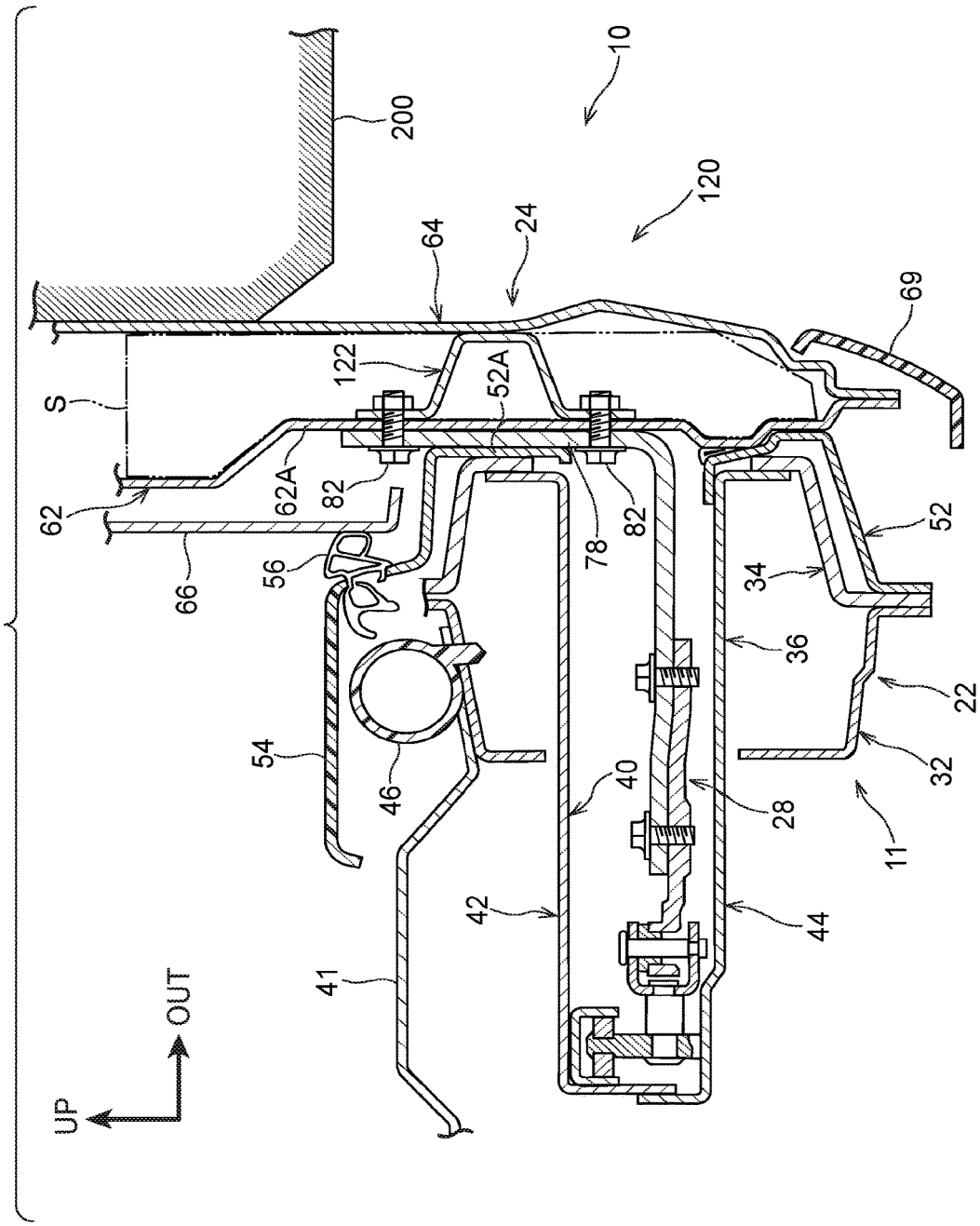
FIG. 8 is an explanatory drawing showing a state in which the barrier has side-collided with the sliding door relating to the second embodiment.

As shown in FIG. 8, at the vehicle side portion structure 120, in a case in which the barrier 200 collides with the rear side door 24 at the time of a side collision, the rear side door 24 is pushed-in toward the vehicle transverse direction inner side by the barrier 200. At this time, due to the collision load that is input to the door outer panel 64, the door outer panel 64 deforms toward the vehicle transverse direction inner side and contacts the load transmitting member 122. Further, due to the collision load being transmitted via the load transmitting member 122 to the mounted-to portion 62A and the mounted portion 78, the mounted-to portion 62A or the mounted portion 78 contacts the vertical wall portion 52A. Moreover, the collision load that is transmitted to the vertical wall portion 52A is transmitted to the rocker 22, and, via the floor cross member 41 and the unillustrated floor panel, is transmitted toward the opposite side in the vehicle transverse direction.

As described above, at the vehicle side portion structure 120, the load transmitting member 122 forms a transmission path of collision load at a region of the vehicle body 11 which region is different from the region to which the door hinge 28 is connected. Therefore, as compared with a structure that does not have the load transmitting member 122, the collision load that is transmitted to the rocker 22 at the time of a side collision of the vehicle 10 can be increased.

Further, at the vehicle side portion structure 120, the load transmitting member 122 and the mounted portion 78 of the door hinge 28 are fastened together with the mounted-to portion 62A by the bolts 82. Therefore, the collision load at the time of a side collision is transmitted not only along the transmission path that is directed from the load transmitting member 122 via the mounted-to portion 62A or the mounted portion 78 toward the rocker 22, but also along the transmission path that is directed from the mounted-to portion 62A via the door hinge 28 toward the rocker outer panel 36. In this way, because there are plural transmission paths of collision load toward the rocker 22, the collision load that is transmitted to the rocker 22 at the time of a side collision of the vehicle 10 can be increased.

Moreover, as shown in FIG. 7, at the vehicle side portion structure 120, when projected in the vehicle transverse direction, the load transmitting member 122 is disposed so as to span between the rocker 22 and the center pillar 16. Therefore, the load transmitting member 122, to which collision load is input in the vehicle transverse direction, moves not only toward the rocker 22, but also moves toward the center pillar 16. Further, the door inner panel 62 (see FIG. 5) contacts not only a region of the side member outer panel 52 (see FIG. 5) which region is lined up with the rocker 22, but also contacts a region that is lined up with the center pillar 16. Due thereto, the collision load that is input to the load transmitting member 122 is transmitted not only to the rocker 22 but also to the center pillar 16, and therefore, the collision load that is transmitted to frame members of the vehicle 10 at the time of a side collision of the vehicle 10 can be increased.

Note that the present disclosure is not limited to the above-described embodiments.

Modified Example

Figure 9:
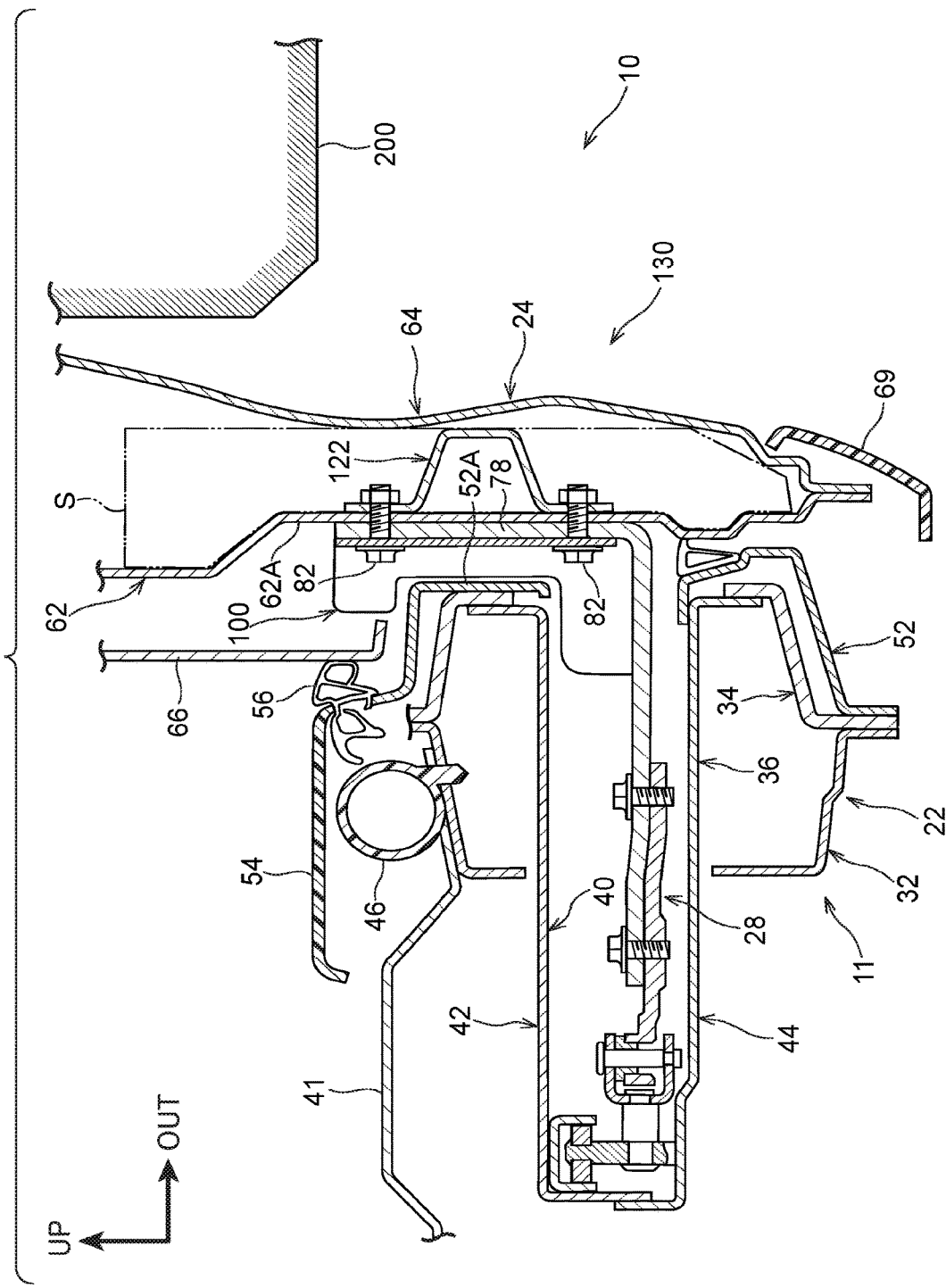
FIG. 9 is an enlarged sectional view of a modified example of the vehicle side portion structures relating to the first embodiment and the second embodiment.

A vehicle side portion structure 130 is illustrated in FIG. 9 as a modified example. The vehicle side portion structure 130 has the rocker 22, the rear side door 24, the load transmitting member 100, and the load transmitting member 122. Namely, the vehicle side portion structure 130 is a structure in which the load transmitting member 122 is mounted to the vehicle transverse direction outer side of the mounted-to portion 62A, and the load transmitting member 100 is mounted to the vehicle transverse direction inner side of the mounted-to portion 62A. Further, the mounted portion 78, the load transmitting member 100 and the load transmitting member 122 are fastened together to the mounted-to portion 62A by the bolts 82.

At the vehicle side portion structure 130, in a case in which the barrier 200 collides with the rear side door 24 at the time of a side collision, the door outer panel 64 deforms toward the vehicle transverse direction inner side and contacts the load transmitting member 122. Further, the collision load is transmitted via the load transmitting member 122 to the mounted-to portion 62A and the mounted portion 78. Moreover, the collision load is transmitted from the mounted-to portion 62A and the mounted portion 78 via the load transmitting member 100 to the vertical wall portion 52A. The collision load that is transmitted to the vertical wall portion 52A is transmitted to the rocker 22, and, via the floor cross member 41 and the unillustrated floor panel, is transmitted toward the opposite side in the vehicle transverse direction. In this way, because the vehicle side portion structure 130 has the load transmitting member 100 and the load transmitting member 122, the collision load that is transmitted to the rocker 22 at the time of a side collision of the vehicle 10 can be increased.

Other Modified Examples

The load transmitting members 100, 122 may be made of aluminum or may be made of resin. The region that the load transmitting member 100 contacts is not limited to the side member outer panel 52, and may be the side surface of the rocker 22.

The flange portions 106 of the load transmitting member 100 may be mounted to regions that are offset, in the vehicle longitudinal direction, from the region of the mounted-to portion 62A to which the mounted portion 78 is mounted. Further, the load transmitting member 100 may be formed integrally with the mounted portion 78. Moreover, the load transmitting member 100 may be a structure that does not have the flange portions 106 and in which the vertical wall portion 102 is mounted to the mounted-to portion 62A by the bolts 82.

Further, the load transmitting member 100 may be a structure that does not have one of the first protruding portion 108 and the second protruding portion 109. In the case of a structure in which the mounted portion 78 extends to the vehicle lower side from the vehicle transverse direction outer side end portion of the extending portion 77, the second protruding portion 109 may be made to protrude toward the lower side in the vehicle vertical direction of the rocker 22. Moreover, the load transmitting member 100 may be made to be a parallelepiped shape that does not have the first protruding portion 108 and the second protruding portion 109.

The load transmitting member 122 is not limited to a structure that is disposed so as to span between the rocker 22 and the center pillar 16 when projected in the vehicle transverse direction, and may be disposed so as to overlap only the rocker 22 when projected in the vehicle transverse direction.

In the mounting of the load transmitting member 100 to the mounted-to portion 62A, the flange portions 106 may be disposed between the mounted-to portion 62A and the mounted portion 78, and may be mounted by being fastened together by the bolts 82.

Although vehicle side portion structures relating to embodiments and modified examples of the present disclosure have been described above, these embodiments and modified examples may be used by being combined together appropriately. The present disclosure can, of course, be implemented in various forms within a scope that does not depart from the gist thereof.

What is claimed is:

1. A vehicle side portion structure comprising:
a rocker that extends in a vehicle longitudinal direction at a vehicle transverse direction outer side of a vehicle body lower portion;
a sliding door that slides in the vehicle longitudinal direction, includes a door inner panel, which is connected to the rocker by a door hinge slidable in the vehicle longitudinal direction and which has a mounted-to portion that is lined up in a vehicle transverse direction with the rocker, and includes a door outer panel that is disposed further toward a vehicle transverse direction outer side than the door inner panel; and
a load transmitting member that is mounted to the mounted-to portion and transmits a collision load, which is input to the door outer panel from a vehicle side, to a region of the rocker that is different from a region to which the door hinge is connected.

2. The vehicle side portion structure of claim 1, wherein:
the door hinge includes a mounted portion that is disposed between the rocker and the door inner panel, and that is superposed from a vehicle transverse direction inner side on the mounted-to portion, and that is mounted to the mounted-to portion by fasteners; and
the load transmitting member is mounted, together with the mounted portion, to the mounted-to portion by the fasteners.

3. The vehicle side portion structure of claim 1, wherein:
a side member outer panel that structures an outer plate of a vehicle is provided at a vehicle transverse direction outer side of the rocker; and
the load transmitting member includes:
a facing portion that faces the side member outer panel in the vehicle transverse direction, and
a protruding portion that protrudes from the facing portion toward a vehicle transverse direction inner side and is lined up in a vehicle vertical direction with the rocker and the side member outer panel.

4. The vehicle side portion structure of claim 3, wherein:
an accommodating portion, which is recessed toward a vehicle transverse direction inner side and accommodates the door hinge, is provided at the rocker; and
the protruding portion includes a first protruding portion that protrudes toward an inner side of the accommodating portion, and a second protruding portion that protrudes toward at least one of an upper side and a lower side, in the vehicle vertical direction, of the rocker.

5. The vehicle side portion structure of claim 1, wherein:
a lower portion, in a vehicle vertical direction, of a center pillar that is provided so as to extend in the vehicle vertical direction is fixed to the rocker; and
the load transmitting member is disposed between the door inner panel and the door outer panel so as to span between the rocker and the center pillar when projected in the vehicle transverse direction, and is mounted to the mounted-to portion from a vehicle transverse direction outer side.

6. The vehicle side portion structure of claim 1, wherein the load transmitting member is disposed between the door inner panel and the door outer panel, and is mounted to the mounted-to portion from the vehicle transverse direction outer side.

7. The vehicle side portion structure of claim 6, wherein the load transmitting member is formed in a hat shape in cross-section that opens toward the vehicle transverse direction inner side.

* * * * *